United States Patent [19]
Johann

[11] Patent Number: 5,286,177
[45] Date of Patent: Feb. 15, 1994

[54] FLUID PUMP HAVING FLOATING RECIPROCATING SHAFT

[75] Inventor: Steven D. Johann, Concord, Calif.

[73] Assignee: Beckman Instruments, Inc., Fullerton, Calif.

[21] Appl. No.: 804,139

[22] Filed: Dec. 10, 1991

Related U.S. Application Data

[62] Division of Ser. No. 481,848, Feb. 20, 1990, Pat. No. 5,152,188.

[51] Int. Cl.$^5$ .............................................. F04B 17/00
[52] U.S. Cl. ................................... 417/415; 417/410 R
[58] Field of Search ................... 417/415, 410; 74/569

[56] References Cited

U.S. PATENT DOCUMENTS

| Re. 31,586 | 5/1984 | Magnussen, Jr. ..................... 417/22 |
| 1,381,223 | 6/1921 | Pelletier ............................. 74/569 X |
| 2,576,269 | 11/1951 | Thomson ................................. 308/6 |
| 2,933,949 | 4/1960 | Bouwkamp ........................... 74/569 |
| 3,005,665 | 10/1961 | Thomson et al. ....................... 308/6 |
| 3,281,192 | 10/1966 | Daubenfeld ........................ 384/590 |
| 3,289,658 | 12/1966 | Surovek, Sr. ...................... 74/569 X |
| 3,933,396 | 1/1976 | Nilsson ............................... 308/6 C |
| 4,469,380 | 9/1984 | Cowles, Sr. .......................... 308/6 C |
| 4,498,793 | 2/1985 | Barrus et al. ...................... 74/569 X |
| 4,512,617 | 4/1985 | Saravis et al. ...................... 308/6 C |
| 4,930,991 | 6/1990 | Bonneyrat et al. .................. 417/415 |

FOREIGN PATENT DOCUMENTS

| 1036957 | 8/1983 | U.S.S.R. ............................. 384/590 |
| 848745 | 9/1960 | United Kingdom ................ 384/590 |

OTHER PUBLICATIONS

Pp. 142 & 143 from Feb. 1989 issue of *Design News*, "Floating Shaft Improves Solvent Pump's Performance", A Cahners Publication.

Primary Examiner—Richard A. Bertsch
Assistant Examiner—Alfred Basichas
Attorney, Agent, or Firm—William H. May; Paul R. Harder; Wen Liu

[57] ABSTRACT

A reciprocating fluid pump having a shaft which dynamically self-corrects angular misalignment between the shaft and its drive mechanism during reciprocative motions. A thrust bearing is utilized to take up axial loading of the shaft to allow the shaft to freely rotate on its supports.

19 Claims, 3 Drawing Sheets

NO MISALIGNMENT

MISALIGNMENT

FLUID PUMP HAVING FLOATING RECIPROCATING SHAFT

This is a division of application Ser. No. 07/481,848 filed Feb. 20, 1990, now U.S. Pat. No. 5,152,188 issued Oct. 6, 1992.

FIELD OF THE INVENTION

The present invention relates to an axially driven reciprocating shaft and more particularly to a reciprocating shaft which is driven axially using a cam and follower mechanism. The present invention is particularly useful, although not limited, for use in a pump for delivering liquid solvents at very high pressures.

DESCRIPTION OF RELATED ART

For high pressure low-volume pumping of fluid, usually a positive displacement pump is used. For example, in liquid chromatography in which a packed column containing finely divided particles is employed for solute separation of a liquid sample, a plunger type pump has been used. This pump comprises a piston which forces the fluid being pumped and is driven by a plunger or drive shaft of the pump to move in a reciprocating motion in a cylinder coaxial with the drive shaft.

An example of a prior art solvent pump is described in U.S. Pat. No. 31,586 which has been assigned to Beckman Instruments, Inc., the assignee of the present invention. The structure and operation of the prior art pump is briefly described below.

Referring to FIG. 1, the prior art pump includes as one of its elements a piston 10 which reciprocates within a chamber 12. The end 14 of the piston 10 contacts the fluid traveling into and out of the chamber 12 through check valves 16 and 18. The end 20 of the piston 10 is coupled to a drive shaft 22 which rides within the barrel 24 on sleeve bearing 26. The drive shaft 22 terminates in a cam follower 28 which rolls or slides on cam surface 30 of the cam 32. A spring 36 is disposed between a flange 38 of the shaft 22 and a shoulder 40 of the sleeve bearing 26. The spring 36 urges the shaft 22 towards cam 32 during the suction interval of the pump and maintains good contact between the cam surface 30 and the surface of the cam follower 28. Axial loading of the spring 36 on its bounding surfaces causes friction at the bounding surfaces which prevents the free rotation of the shaft 22. The cam 32 is rotated about the cam axis 42 by a driving means such as an electric motor (not shown). As the cam 32 rotates, the drive shaft 22 is caused to translate axially in a reciprocative motion (arrow A) as a result of the eccentric interaction between the cam 32 and follower 28. Consequently, the piston 10 reciprocates within the chamber 12 to fill and empty the chamber of fluid. A cam alignment pin 34 held in a bushing 35 prevents rotation of the drive shaft 22 which would otherwise cause misalignment of the cam follower 28 and the cam 32. Misalignment is taken to mean that the axis of the cam 32 is no longer parallel to the axis of the cam follower 28, similar to the situation illustrated in FIG. 4B which will be referred to hereinbelow in the detail description.

While the prior art pump has been found to be satisfactory in performance, it has several shortcomings. The alignment pin 34 does not eliminate misalignment entirely. It has been found that the operation of the pump may fail when there is even a slight misalignment between the cam 32 and cam follower 28. This misalignment arises from the allowance for fit of the cam alignment pin 34 and its bushing 35 and the drive shaft 22 and its sleeve bearing 26. It also arises from manufacturing tolerance of the many components. Misalignment increases with wear of the components. It is noted that as the spring 36 is compressed and extended during reciprocative motion of the shaft 22, the spring may coil thereby creating a torsion force which tends to rotate the shaft causing misalignment. It has been found that a misalignment angle of as little as one-half degree could stall the pump in the absence of lubricant at the contact surface of the cam and its follower.

The misalignment of the cam 32 and cam follower 28 affects pump operation by creating a component of sliding friction force between the surfaces of the cam and cam follower in the direction of the cam follower axis. This causes wear on the surfaces of the cam 32 and follower 28 as well as wear on the grease seals and bearings of the cam follower. As a result, bearing grease is lost from heat produced in the bearings and through worn seals. The friction force component also causes the drive shaft 22 to knock against the support sleeve bearings 26 which would further cause the sleeve bearing to wear prematurely. The down time for servicing the pump to replace the worn components will increase. All of the above-mentioned effects of misalignment between the cam and cam follower on the pump performance increase with increase in pump output pressure.

SUMMARY OF THE INVENTION

The present invention is directed to an axially reciprocating shaft which dynamically self-corrects angular misalignment between the shaft and its drive mechanism during reciprocative motions. In particular, a thrust bearing is utilized to reduce angular frictional torque loading of the shaft to allow the shaft to freely rotate to dynamically realign the cam follower and the drive mechanism.

In one form of the present invention, the shaft is supported in linear bearing which allows it to freely rotate. The thrust bearing is between the shaft and its return spring to remove the friction that otherwise would prevent free rotation of the shaft. For implementation in which the shaft is used as a power transmission shaft driven by a cam and follower mechanism, angular misalignment between the cam and its follower is dynamically self-corrected by rotation of the shaft at the thrust bearing.

DESCRIPTION OF ILLUSTRATED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

The shaft of the present invention will be described below with reference to a solvent pump in which a cam and follower mechanism is used to drive the shaft. The present invention is in no way limited to such an implementation. It is to be understood that the shaft of the present invention can be implemented in other types of devices for power transmission.

Figure 2:
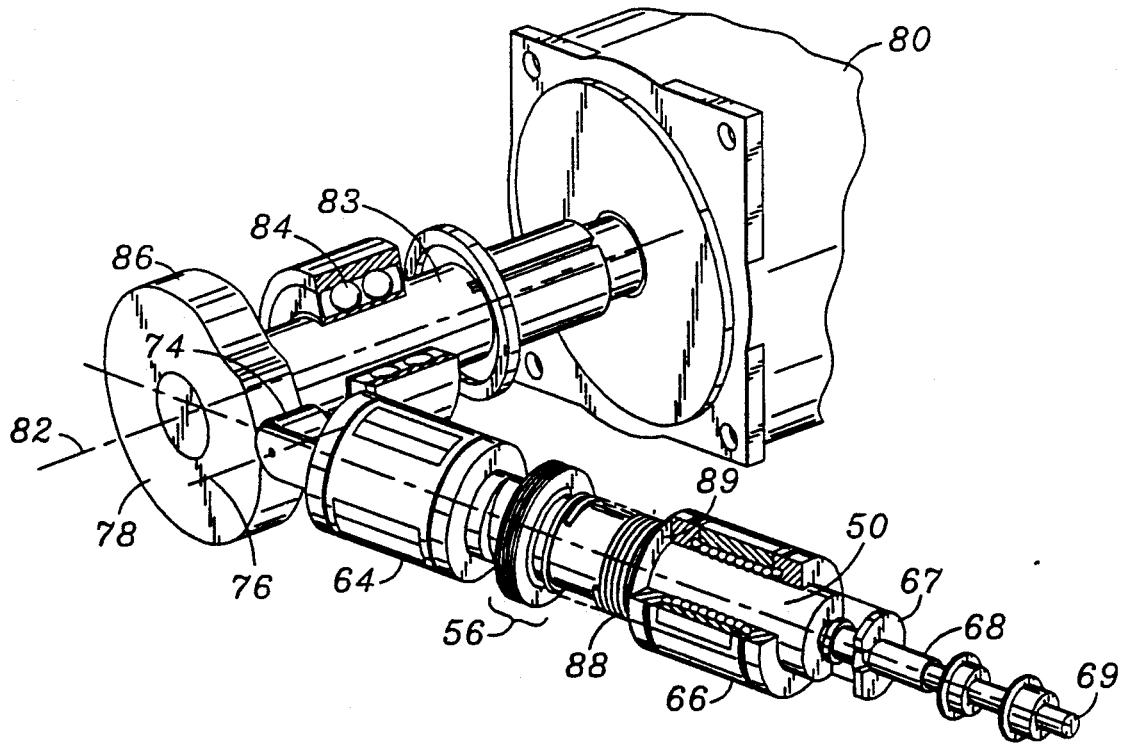
FIG. 2 is a pictorial view of a shaft and drive mechanism in accordance with one embodiment of the present invention.
Figure 3:
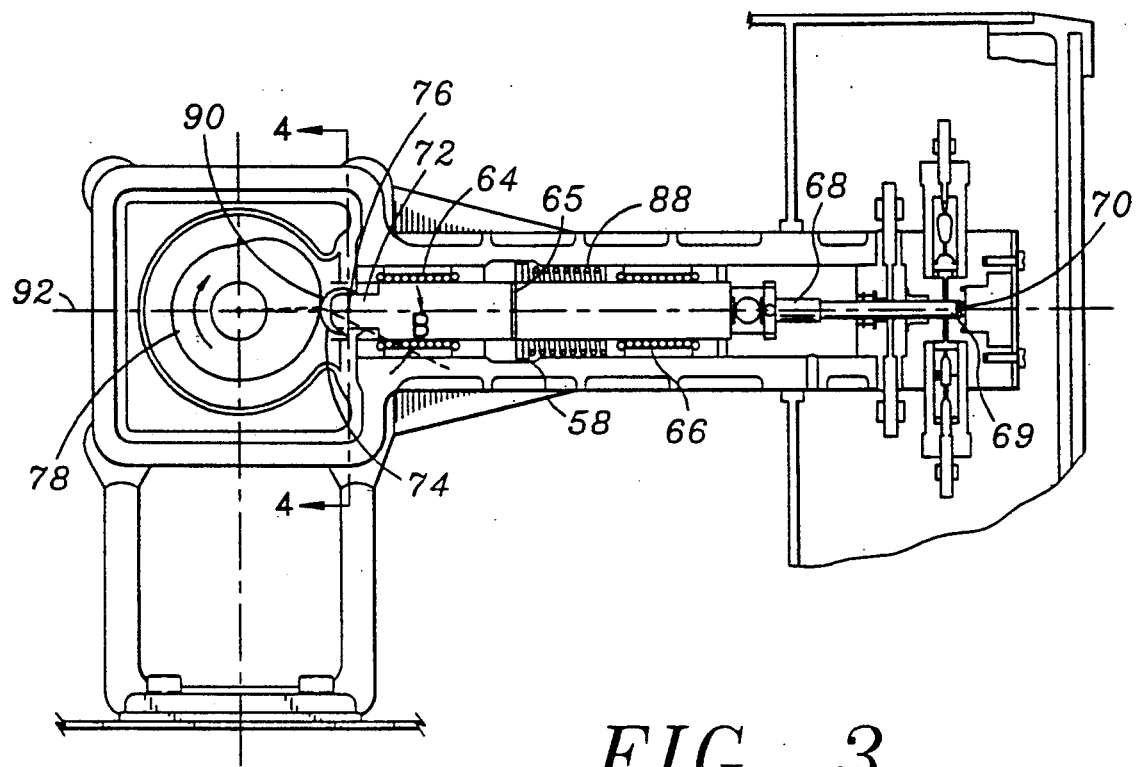
FIG. 3 is a sectional view of a solvent pump in which the shaft of FIG. 2 is used.
Figure 5:
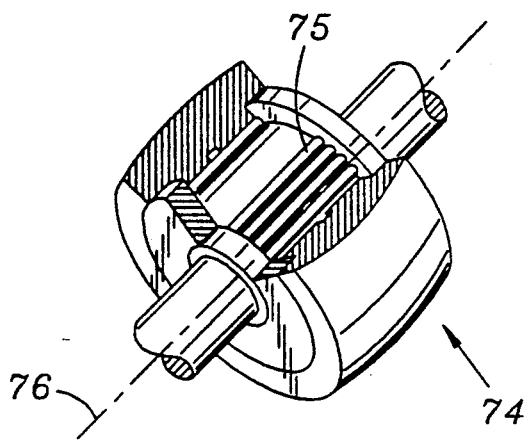
FIG. 5 is a perspective view, partially broken away, of the cam follower.

Referring to FIG. 2, a shaft 50 in accordance with one embodiment of the present invention is shown driven by a cam and follower mechanism. The shaft 50 is supported on linear ball bearings 64, 66 which allow the shaft 50 to move axially and rotate. The bearing 64 and 66 restrains the shaft 50 from rotating longitudinally. One end 67 of the shaft 50 is coupled to a floating piston 68 which has been described in U.S. Pat. No. 4,790,236 which is assigned to the assignee of the present invention. Referring to FIG. 3 which shows the cross-section of a solvent pump employing the shaft shown in FIG. 2, the end 69 of the piston 68 is guided for longitudinal reciprocating motion within a chamber 70 to effect pumping action. The end 72 of the shaft 50 is coupled to a generally cylindrical cam follower 74 which is supported on a roller bearing 75 for rotation about an axis 76 (see also FIG. 5). The surface of the cam follower 74 is slightly radiused along its axial direction, i.e. a crown profile. The advantage of this will be apparent after the self-alignment mechanism has been explained below.

A cam 78 is driven by a drive motor 80 to rotate about axis 82 which should be maintained perpendicular to the axis of the shaft 50 and parallel to the cam follower axis 76. The shaft 83 of the cam 78 is supported on a ball bearing 84. The surface 86 of the cam 78 is flat across its width (in the axial direction) and has a convolute profile which will interact with the follower 74 to cause the shaft 50 to reciprocate axially. The cam profile is determined according to the desired amount of axial translation of the shaft 50 and the desired time dependent output pressure profile to be delivered by the pump. Typically, the cam profile is shaped such that the pressure interval is long during which pressure is gradually built up and delivered to the fluid being pumped and the suction interval is substantially shorter during which the pump is refilled with fluid being pumped. A spring 88 is provided which biases the shaft 50 towards the cam 78 during the suction interval and maintains contact between the cam 78 and follower 74.

Figure 4A:
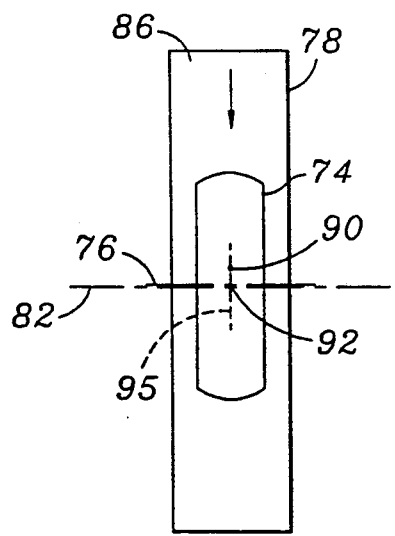
FIGS. 4 A-B are diagrams showing the forces acting on the cam follower.
Figure 4B:
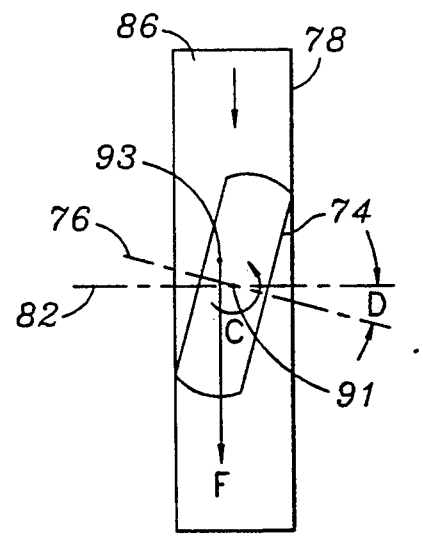

Referring to FIGS. 4A and 4B, the self-realignment mechanism of the shaft 50 is explained. Ideally, the axis 82 of the cam 78 should be maintained parallel to the axis 76 of the follower 74. In the absence of misalignment the instantaneous contact point between the cam 78 and follower 74 at equilibrium is indicated by the point 90 in FIG. 4A. The point 92 represents the axis of the shaft 50. Referring to FIG. 3, because of the eccentricity of the cam 78, the contact point 90 is located on the perimeter of the cam 78 at an angle B in reference to the axis 92 during most part of a cam revolution. This angle B is known as pressure angle and is the measure of instantaneous force transmission properties of the cam mechanism. The pressure angle B varies during a revolution of the cam. Thus, the ideal trace of the instantaneous contact points for a cam revolution is along dotted line 95.

Referring to FIG. 4B, in the event of angular misalignment D between the cam follower 74 and the cam 78, the axis 76 of the cam follower 74 is no longer parallel to the cam 78 in this plane. The contact point 90 moves away from the center. At this position, the cam follower 74 contacts the cam 78 at point 93. A force F is exerted by the cam 78 against the follower 74 at the contact point 93. As can be seen from FIG. 4B, the force F creates a torque (arrow C) about the axis 91 of the pump shaft 50. As a result, the shaft 50 rotates to realign the axis 76 of the follower 74 to be parallel to the cam axis 82 such that the equilibrium configuration shown in FIG. 4A is restored.

By slightly radiusing the surface of the cam follower 74, the restoring torque increases slowly as the shaft 50 rotates out of alignment. If the surface of the cam follower 74 is flat across its width, the contact point would instantly move from position 90 to a position at the outer edge of the cam follower for even very small angular misalignments.

Figure 1:
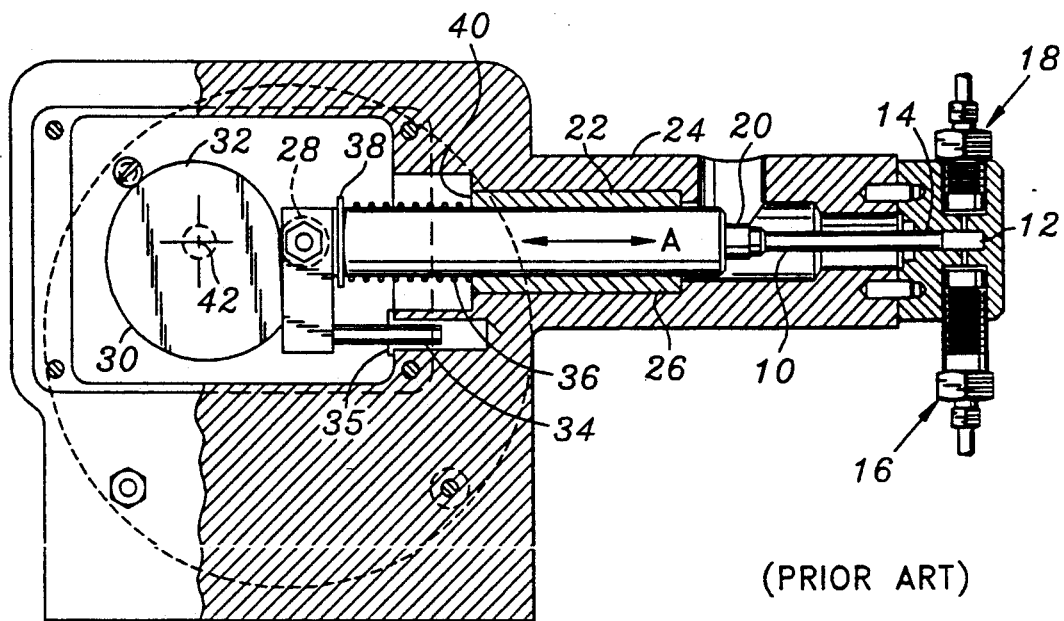
FIG. 1 is a sectional view of a prior art solvent pump.

With the understanding of the self-alignment mechanism, it is apparent that the shaft 50 should be allowed to freely rotate in response to the restoring torque. Unlike the prior art pump, rigid alignment means, such as alignment support 34, is not utilized in view of dynamic alignment capability. As was discussed in the background section, in the prior art pump shown in FIG. 1, friction caused by axial loading between the spring 36 and its bounding surfaces prevents the free rotation of the shaft 22. In the present invention, in order to allow the shaft 50 to freely rotate to self-align, a thrust bearing assembly 56 has been added to torsionally decouple the spring 88 and the shaft 50.

Figure 6:
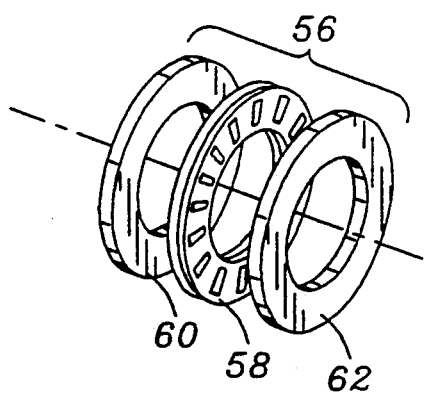
FIG. 6 is an expanded view of the thrust bearing assembly.

In the embodiment shown, needle bearing 58 is sandwiched between two bearing races 60 and 62 (more clearly shown in FIG. 6). At least the race 60 is retained along an axial position along the shaft 50 with a retaining ring 65 which is held in a groove in the shaft. Spring 88 presses against race 62, needle bearing 58 and race 60 against the retaining ring. It has been found that the restoring torque created by the contact between the cam 78 and cam follower 74 is sufficient to overcome the low angular friction of the thrust bearing.

It will be appreciated that the thrust bearing assembly 56 may be placed at either end of the spring anywhere along the shaft. For example, a thrust bearing assembly may be placed between the spring 88 and the bearing shoulder 89. In this embodiment, the other end of the spring away from the thrust bearing assembly pushes on a washer retained along the shaft. The spring would rotate with the shaft 50. Likewise, the prior art pump of FIG. 1 may be modified with the addition of a thrust bearing assembly placed at the end of the shaft against the flange 38 or against bearing shoulder 40.

While the invention has been described with respect to the preferred embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

I claim:

1. A fluid pump comprising:
   a cam driven to rotate;
   a longitudinal shaft supported for axial reciprocative motion to effect pumping of fluid;

a cam follower coupled to one end of the shaft in operative engagement with the cam;

a spring load on the shaft biased axially and towards the cam follower, whereby the cam and cam follower together with the spring load effect axial reciprocative motion of the shaft;

a bearing supporting the shaft for rotational movement and torsionally decoupling the shaft and the spring load.

2. A pump as in claim 1 wherein the cam follower has a generally cylindrical surface.

3. A pump as in claim 2 wherein the generally cylindrical surface is radiused in its axial direction.

4. A pump as in claim 1 wherein the shaft comprises a piston which effects pumping of fluid into and out of a fluid chamber.

5. A pump as in claim 1 wherein the bearing comprises a thrust bearing.

6. A pump as in claim 1 wherein the bearing comprises a needle bearing.

7. A fluid pump comprising:

a cam driven to rotate;

a shaft having an axis, the shaft being supported for axial reciprocative motion;

a cam follower coupled to the shaft in operative engagement with the cam to cause the shaft to reciprocate axially, whereby the shaft effects pumping of fluid as the shaft reciprocates, and whereby the cam and cam follower cooperatively effect a restoring torque about the axis of the shaft when there is angular misalignment of the cam follower with respect to the cam abut the axis so as to rotate the shaft about the axis to bring the cam follower into angular alignment with the cam;

retaining means on the shaft subject to an axially directed spring load, the retaining means for transmitting axial force of the spring load to the shaft; and a bearing axially coupling the retaining means and the spring load but torsionally decoupling the spring load and the retaining means whereby the bearing allows the shaft and retaining means to rotate substantially freely under the restoring torque despite the axial spring load against the bearing and retaining means.

8. A pump as in claim 7 wherein the cam follower has a generally cylindrical surface.

9. A pump as in claim 8 wherein the generally cylindrical surface is radiused in its axial direction.

10. A pump as in claim 7 wherein the shaft comprises a piston which effects pumping of fluid into and out of a fluid chamber.

11. A pump as in claim 7 wherein the bearing comprises a thrust bearing.

12. A pump as in claim 7 wherein the bearing comprises a needle bearing.

13. A fluid pump comprising:

a fluid chamber having fluid inlet and outlet;

a cam;

means for rotating the cam;

a shaft having an axis, the shaft operates on the fluid chamber to effect pumping of fluid;

a cam follower coupled to one end of the shaft in operative engagement with the cam, the cam follower having a profile which cooperatively engages the cam to produce a restoring torque about the axis to correct angular misalignment of the cam follower with respect to the cam about the axis caused by rotation of the shaft body out of angular alignment;

means for supporting the shaft for axial reciprocative motion upon action of the cam against the follower thereby effecting pumping of fluid into and out of the fluid chamber;

bearing means for torsionally decoupling axial loading and the shaft thereby to allow rotational movement of the shaft under the restoring torque; and a spring biased against the bearing means to exert an axial loading on the shaft, wherein the bearing means allows substantially free rotational movement of the shaft under the restoring torque despite the axial loading.

14. A pump as in claim 13 wherein the bearing means is a thrust bearing.

15. A pump as in claim 14 wherein the thrust bearing is spring loaded in a direction toward the cam.

16. A pump as in claim 14 wherein the shaft has a retaining means against which the thrust bearing is spring loaded.

17. A pump as in claim 13 wherein the cam follower has a generally cylindrical surface.

18. A pump as in claim 17 wherein the generally cylindrical surface is radiused in its axial direction.

19. A pump as in claim 13 wherein the shaft comprises a piston at another end of the shaft in operative engagement with the fluid chamber to effect fluid pumping upon reciprocative motion of the shaft including the piston.

* * * * *